United States Patent
Park et al.

(10) Patent No.: US 8,655,391 B2
(45) Date of Patent: Feb. 18, 2014

(54) METHOD FOR PAGING IN WIRELESS ACCESS SYSTEM

(75) Inventors: Gi Won Park, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 589 days.

(21) Appl. No.: 12/463,302

(22) Filed: May 8, 2009

(65) Prior Publication Data

US 2009/0280848 A1    Nov. 12, 2009

Related U.S. Application Data

(60) Provisional application No. 61/051,684, filed on May 9, 2008.

(30) Foreign Application Priority Data

Jul. 21, 2008    (KR) ........................ 10-2008-0070576

(51) Int. Cl.
*H04W 68/00* (2009.01)
(52) U.S. Cl.
USPC ............ 455/458; 455/444; 455/446; 455/455
(58) Field of Classification Search
None
See application file for complete search history.

(56) References Cited

U.S. PATENT DOCUMENTS

| | | | |
|---|---|---|---|
| 5,898,904 A * | 4/1999 | Wang | 340/7.27 |
| 6,049,532 A * | 4/2000 | Steele et al. | 370/311 |
| 2002/0068527 A1* | 6/2002 | Massingill et al. | 455/13.4 |
| 2005/0124358 A1* | 6/2005 | Willey | 455/458 |
| 2005/0277429 A1 | 12/2005 | Laroia et al. | |
| 2006/0025134 A1* | 2/2006 | Cho et al. | 455/435.1 |
| 2006/0089161 A1* | 4/2006 | Kim et al. | 455/458 |
| 2006/0160558 A1* | 7/2006 | Kim et al. | 455/522 |
| 2007/0077922 A1* | 4/2007 | Kim et al. | 455/414.2 |
| 2007/0099635 A1* | 5/2007 | Mohanty et al. | 455/458 |
| 2008/0084941 A1* | 4/2008 | Mohanty et al. | 375/260 |
| 2008/0102789 A1* | 5/2008 | Sung | 455/406 |
| 2008/0188247 A1* | 8/2008 | Worrall | 455/458 |

FOREIGN PATENT DOCUMENTS

WO    2006/001674    1/2006
WO    2006/138573    12/2006

OTHER PUBLICATIONS

LG Electronics Inc. et al., "IEEE 802.16m Hierarchical Paging Operation for Efficient Power Management," IEEE 802.16 Broadband Wireless Access Working Group, IEEE C802.16m_081777, Jul. 7, 2008.

M. Szalay et al., "Hierarchical Paging—Efficient Location Management," The Proceedings of the Fourth European Conference on Universal Multiservice Networks (ECUMN'07), Feb. 2007, pp. 301-310.

Ramachandran Ramjee et al., "IP Paging Service for Mobile Hosts," Wireless Networks, Sep. 2002, vol. 8, No. 5, pp. 427-441.

Sassan Ahmadi, "Views on IEEE 802.16m Frame Structure", C80216m-07_354, Nov. 2007.

* cited by examiner

*Primary Examiner* — Suhail Khan
(74) *Attorney, Agent, or Firm* — Lee, Hong, Degerman, Kang & Waimey

(57) ABSTRACT

A method for paging in a wireless access system is disclosed. A method for paging a mobile station of an idle mode comprises allocating large paging group identifier and small paging group identifier of a paging group to which the mobile station belongs to a header; allocating a large paging group flag and a small paging group flag to the header, the large paging group flag and the small paging group flag indicating the presence of a paging message for the mobile station; and transmitting the header to the mobile station of the idle mode.

12 Claims, 8 Drawing Sheets

METHOD FOR PAGING IN WIRELESS ACCESS SYSTEM

This application claims the benefit of earlier filing date and right of priority to Korean Patent Application No. 10-2008-0070576, filed on Jul. 21, 2008, and U.S. Provisional Application No. 61/051,684 filed on May 9, 2008, the contents of all of which are hereby incorporated by reference herein in their entireties.

BACKGROUND OF THE INVENTION

1. Field of the Invention

The present invention relates to a method for paging in a wireless access system.

2. Discussion of the Related Art

The following is a brief description of a channel estimation method and pilot signals.

Hereinafter, a paging group and an idle mode of a mobile station, which are related to the embodiments of the present invention, will be described in brief.

FIG. 1 is a diagram illustrating an example of a paging group comprised of a plurality of base stations.

Paging means a function that can identify a location (for example, any base station or any exchange station) of a corresponding mobile station (MS) when an incoming call occurs in mobile communication. As illustrated in FIG. 1, a plurality of base stations (BS) which support an idle mode belong to a paging group to constitute a paging region.

The paging group represents a logical group. The paging group is to provide a neighboring range region that can be paged to a downlink (DL) if there is any traffic targeting a mobile station (MS). And, the paging group should meet the condition to be large enough for a specific terminal to exist for most of time within a same paging group and the condition to be small enough for a paging load to maintain a proper level.

FIG. 1 illustrates four paging groups defined in multiple base stations located in hexagonal lattices. One base station can be included in one or more paging groups. The paging group is defined by a management system. A paging group-action backbone network message can be used in the paging group. Also, a paging controller cam manage a list of mobile stations which are in an idle mode, using a paging-announce message which is one of the backbone network message, and can manage initial paging of all base stations belonging to the paging group.

The idle mode means a support operation that allows a mobile station to periodically receive downlink broadcast traffic transmission even though the mobile station is not subscribed to a specific base station when moving a wireless link condition of multiple base stations.

The mobile station can be benefited by the idle mode as action requirements related to handover and general operation requirements are removed. The idle mode can save the power and management resources used by the mobile station by limiting action of the mobile station to be scanned during a discrete period.

Furthermore, the idle mode provides a simple and proper mode that can notify the mobile station of downlink traffic which is pending. The idle mode can provide benefit to a network and a base station by removing a wireless interface and network handover (HO) traffic from the mobile station which is not active.

Paging is performed in a unit of paging group in the idle mode. Referring to FIG. 1, the mobile station can belong to one or more paging groups, and a paging controller of each paging group performs paging to page the mobile station if a call or a user packet from external network appears. At this time, the paging controller transfers a paging message to all base stations within the paging groups, and the base stations which have received the paging message perform paging by broadcasting MOB_PAG-ADV message to the mobile station.

SUMMARY OF THE INVENTION

Generally, a paging group that covers one wide area for idle-mode terminals is used (see FIG. 1). If a call or packet to be transmitted to the mobile station occurs, the paging controller should transfer a paging message to all base station within the paging groups to page a corresponding mobile station. Also, a problem occurs in that all mobile stations within the paging groups should continue to monitor a wireless channel for a paging listening period to identity whether there is any paging message transferred thereto.

Accordingly, the present invention is directed to a method for paging in a wireless access system, which substantially obviates one or more problems due to limitations and disadvantages of the related art.

An object of the present invention is to provide a method for performing paging efficiently in a wireless access system.

Another object of the present invention is to provide a method for paging in a wireless access system, in which a new paging group ID and a new paging indicator flag are used.

Still another object of the present invention is to provide a method for paging in a wireless access system, in which a superframe header structure which includes a paging group ID and a paging indicator flag is provided to enable efficient data communication and minimize power consumption of a mobile station.

Further still another object of the present invention is to provide a method for paging in a wireless access system, in which paging information is transmitted using a broadcasting channel region of a superframe header.

The technical problem which is to be obviated by the present invention is not limited to the problems mentioned above. Moreover, other problems which are not mentioned above can be apparent to those skilled in the art from the description which follows.

In order to solve the above technical problems, the present invention discloses a method for efficiently paging in a wireless access system.

In one aspect of the present invention, a method for paging a mobile station of an idle mode comprises allocating large paging group identifier and small paging group identifier of a paging group to which the mobile station belongs to a header; allocating a large paging group flag and a small paging group flag to the header, the large paging group flag and the small paging group flag indicating the presence of a paging message for the mobile station; and transmitting the header to the mobile station of the idle mode.

Preferably, the header is included in a superframe header, and the large paging group identifier and the small paging group identifier are allocated to a broadcast channel (BCH) of the superframe header.

Also, the large paging group flag and the small paging group flag may be allocated to the broadcast channel (BCH) of the superframe header.

Also, the large paging group flag and the small paging group flag may be allocated to a quick paging channel (QPCH) of the superframe header.

Also, the large paging group identifier is included in a broadcast channel region of the broadcast channel, the broadcast channel region using a single frequency carrier network, and the small paging group identifier is included in a cell specific broadcast channel region of the broadcast channel. At this time, it is preferable that the large paging group flag is included in a broadcast channel region of the broadcast channel, the broadcast channel region using a single frequency carrier network, and the small paging group flag is included in a cell specific broadcast channel region of the broadcast channel.

In another aspect of the present invention, a method for paging a mobile station of an idle mode comprises receiving a header including large paging group identifier and small paging group identifier of a paging group where the mobile station is located; and receiving a paging message using the header. At this time, the header is a superframe header, and the large paging group identifier and the small paging group identifier are included in a broadcast channel (BCH) region of the superframe header.

In still another aspect of the present invention, a method for paging a mobile station of an idle mode comprises receiving first paging information including paging cycle index determining paging cycle, paging group offset, and paging group identifier; receiving a header including second paging information for a predetermined time period using the paging cycle index and the paging group offset; and receiving a paging message using the second paging information.

In this case, the paging group offset includes large paging group offset and small paging group offset, and the paging group identifier includes large paging group identifier and small paging group identifier. The first paging information further includes a paging cycle and a small paging group change counter. Also, the header which includes the second paging information is a superframe header, and the large paging group identifier and the small paging group identifier to which the mobile station currently belongs are included in a broadcast channel (BCH) of the superframe header.

In further still another aspect of the present invention, a method for receiving a paging message in a mobile station of an idle mode comprises receiving paging information including one or more of large paging group identifier, large paging group offset, small paging group identifier, and small paging group offset of a paging group to which the mobile station belongs.

In this case, the method further comprises the mobile station decoding a predetermined radio resource from a small paging group using the small paging group identifier and the small paging group offset, the mobile station moving from the small paging group to the large paging group, and the mobile station receiving a paging message using the large paging group offset from the large paging group.

The method further comprises the mobile station decoding a predetermined radio resource from a large paging group using the large paging group identifier and the large paging group offset, the mobile station moving from the large paging group to the small paging group, and the mobile station receiving a paging message using the small paging group identifier and the small paging group offset from the large paging group.

The base station transmits one of a superframe header (SFH) and a deregistration command (DREG-CMD) message, which includes the paging information, to the mobile station.

The large paging group identifier, the large paging group offset, the small paging group identifier, and the small paging group offset are included in a broadcast channel (BCH) region of the superframe header.

The broadcast channel region further includes a large paging group flag and a small paging group flag indicating the presence of the paging message for the mobile station.

The broadcast channel of the superframe header includes a single frequency carrier network broadcast channel region and a cell specific broadcast channel region. At this time, the large paging group identifier, the large paging group offset, and the large paging group flag are included in the single frequency carrier network broadcast channel region. Also, the small paging group identifier, the small paging group offset, and the small paging group flag are included in the cell specific broadcast channel region. At this time, the superframe header further includes a quick paging channel, and the large paging group flag and the small paging group flag indicating the presence of the paging message for the mobile station are included in the quick paging channel.

According to technical spirits of the present invention, the following effects can be obtained.

First of all, as the embodiments of the present invention are used, the mobile station and the base station can perform efficient paging.

Second, the mobile station can identify whether there is any paging information thereto, by using a new paging group ID and a new paging indicator flag. Accordingly, the mobile station can efficiently manage the power by monitoring a paging channel in a specific frame only.

Third, the mobile station and the base station can perform efficient data communication by using a new superframe header structure which includes a paging group ID and a paging indicator flag. Also, it is possible to maximize available power of the mobile station.

Fourth, the mobile station can efficiently receive a paging message by using large paging group offset and small paging group offset. Namely, since the mobile station monitors a paging message for a corresponding offset period, the mobile station can maintain a sleep mode for another paging cycle. Accordingly, the mobile station can perform efficient paging.

Additional features and advantages which are not mentioned above of the invention will be set forth in the description which follows, and will be apparent to those skilled in the art from the description, or may be learned by practice of the invention.

DETAILED DESCRIPTION OF THE INVENTION

Figure 1:
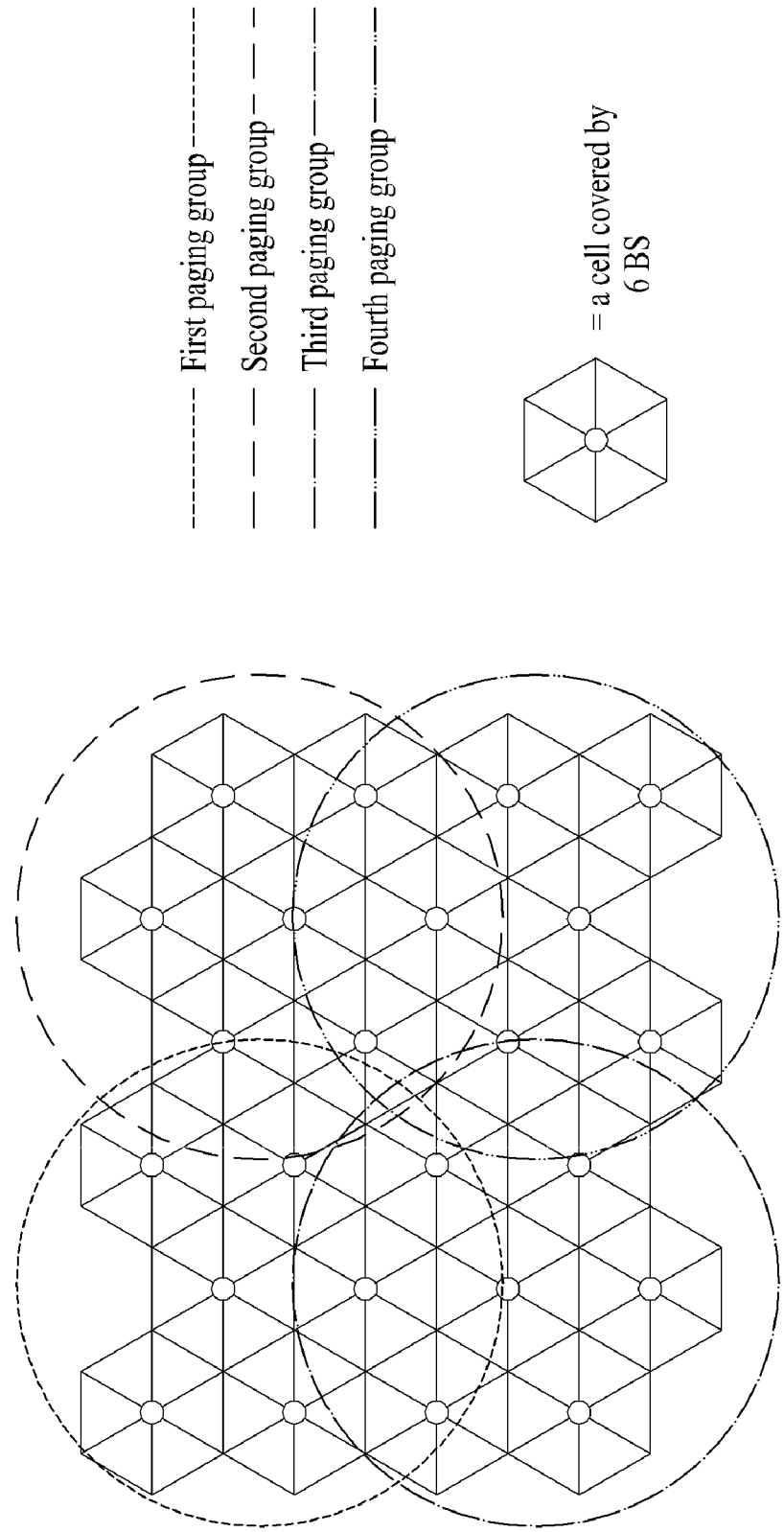
FIG. 1 is a diagram illustrating an example of a paging group comprised of a plurality of base stations.

The present invention relates a method for efficient paging in a wireless access system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, procedures or steps that may make the subject matter of the present invention obscure will be omitted, and procedures or steps equivalent to the range that can be understood by those skilled in the art will be omitted.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment (UE), a subscriber station (SS), a mobile subscriber station (MSS), and a terminal.

Furthermore, a transmitter means a node that transmits data or voice service, and a receiver means a node that receives data or voice service. Accordingly, in an uplink, the mobile station could be a transmitter, and the base station could be a receiver. Likewise, in a downlink, the mobile station could be a receiver, and the base station could be a transmitter.

Meanwhile, in the present invention, examples of the mobile station include a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, and a multi mode-multi band (MM-MB) terminal.

In this case, the smart phone means a terminal having advantages of a mobile communication terminal and a personal mobile terminal in combination. Namely, the smart phone can mean a terminal that data communication functions such as schedule management, facsimile transmission and reception, and Internet access, which correspond to functions of personal mobile terminal, are added to the mobile communication terminal. Also, the multi mode-multi band terminal means a mobile terminal having a multi-modem chip to be operated in a portable Internet system and other mobile communication systems (for example, code division multiple access (CDMA) 2000 system, WCDMA system, etc.).

The embodiments according to the present invention may be implemented by various means, for example, hardware, firmware, software, or their combination.

If the embodiment according to the present invention is implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of the IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

Figure 2:
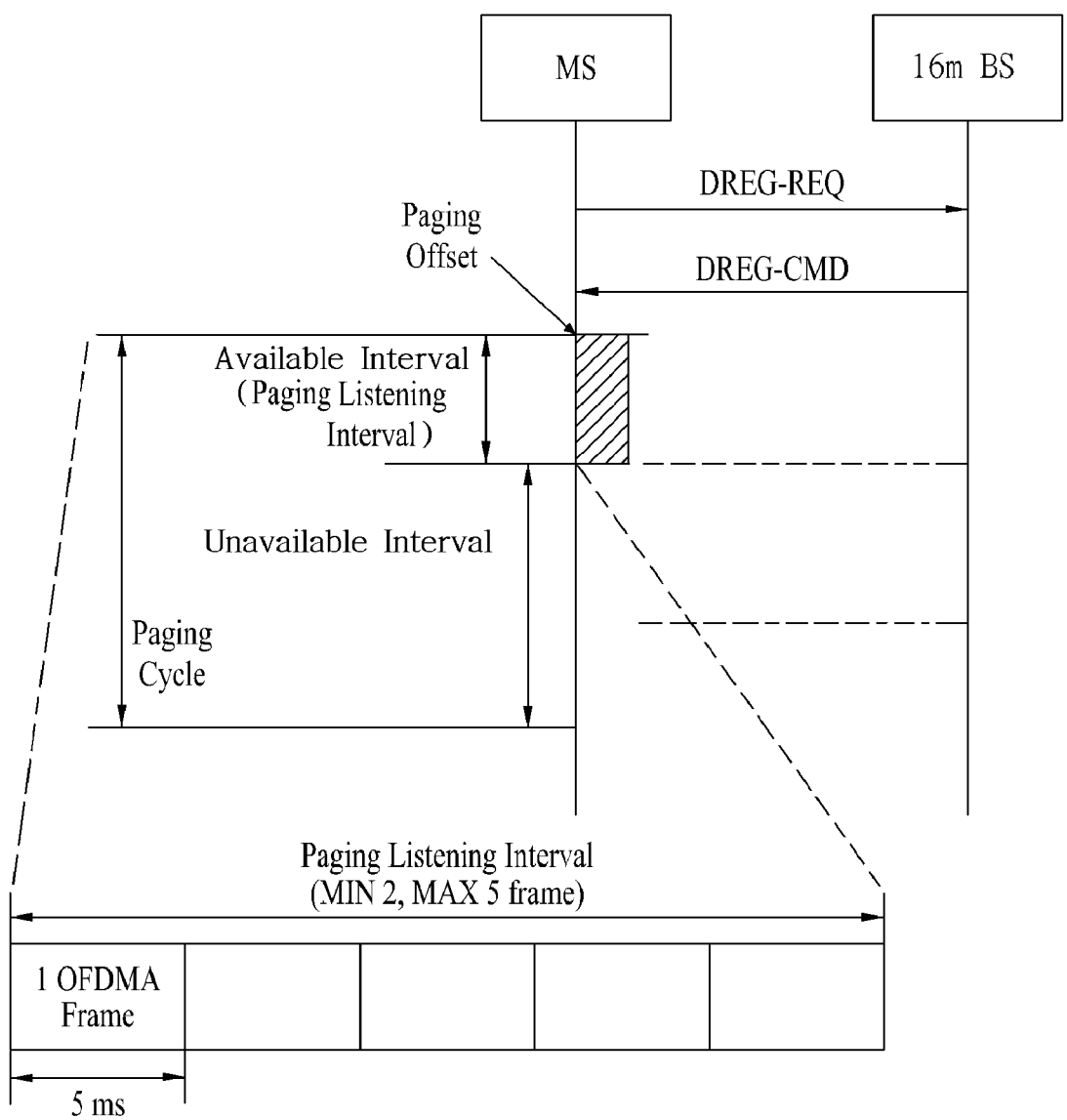
FIG. 2 is a diagram illustrating a paging procedure of a mobile station.

FIG. 2 is a diagram illustrating a paging procedure of a mobile station.

The mobile station can transmit a deregistration request (DREG-REQ) message to a serving base station to enter an idle mode. The serving base station transmits a deregistration command (DREG-CMD) message to the mobile station to accept entrance of the mobile station to the idle mode.

The serving base station transmits the deregistration command (DREG-CMD) message, which includes a paging information field, to the mobile station. The paging information field includes a paging cycle, paging offset, and paging listening interval value. The mobile station can receive a paging message transmitted thereto by using paging information. The mobile station monitors a wireless channel for a paging cycle to receive the paging message. At this time, a paging interval could be from minimum two frames to maximum five frames. One OFDMA frame can have a size of 5 ms.

Hereinafter, various embodiments according to technical spirits of the present invention will be described in detail.

In the embodiments of the present invention, a small paging group (SPG) is newly defined. The small paging group (SPG) may mean a paging group of a smaller size than a general paging group. Also, a large paging group (LPG) having a relatively large region greater than an existing paging group is newly defined. At this time, in the embodiments of the present invention, the SPG may be referred to as a primary paging group, and the LPG may be referred to as a secondary paging group. Also, a paging group primarily set in accordance with the allocation order of paging groups may be referred to as a primary paging group, and next paging group may be referred to as a secondary paging group.

For example, one or more SPGs can be included in the existing paging group, and one or more existing paging groups can be included in the LPG. Also, one or more SPGs can be included in the LPG, and one or more base stations can be included in the SPG. Sizes of the LPG and the SPG may be varied depending on user requirements or channel status.

In the embodiments of the present invention, if the mobile station is located within a specific SPG, a paging controller (PC) can transmit a paging message to base stations only within a corresponding SPG. Accordingly, mobile stations which belong to other SPGs can reduce power consumption when monitoring the paging message.

Of course, if the mobile station is not located in a predetermined SPG, the paging controller can transmit a paging message to all base stations included in the large paging group (LPG). Also, in the present invention, two paging group identifiers (for example, LPG ID and SPG ID) are newly defined. Moreover, if the mobile station belongs to multiple paging groups (for example, one or more LPGs and one or more SPGs), the base station can set multi paging offset (multiple paging groups) according to each paging group. At this time, the multi paging offset can include one or more small paging group offset values and/or one or more large paging group offset values.

Therefore, the base station can allocate one or more of SPG ID, SPG offset, LPG ID, and LPG Offset to each mobile station and notify the mobile station of it. All mobile stations can receive the paging message by using one or more of specific SPG ID, small paging group offset, LPG ID, and large paging group offset.

A superframe used in the embodiments of the present invention includes four frames, and can have a size of 20 ms. Also, one frame can include eight subframes. However, the superframe can include subframe only.

A superframe header (SFH) which includes scheduling information of the superframe can be allocated to the first subframe of the superframe. Also, the superframe header (SFH) can include a synchronization channel and broadcast channel (BCH) region.

1. Superframe Header Structure for Efficient Paging

Figure 3:
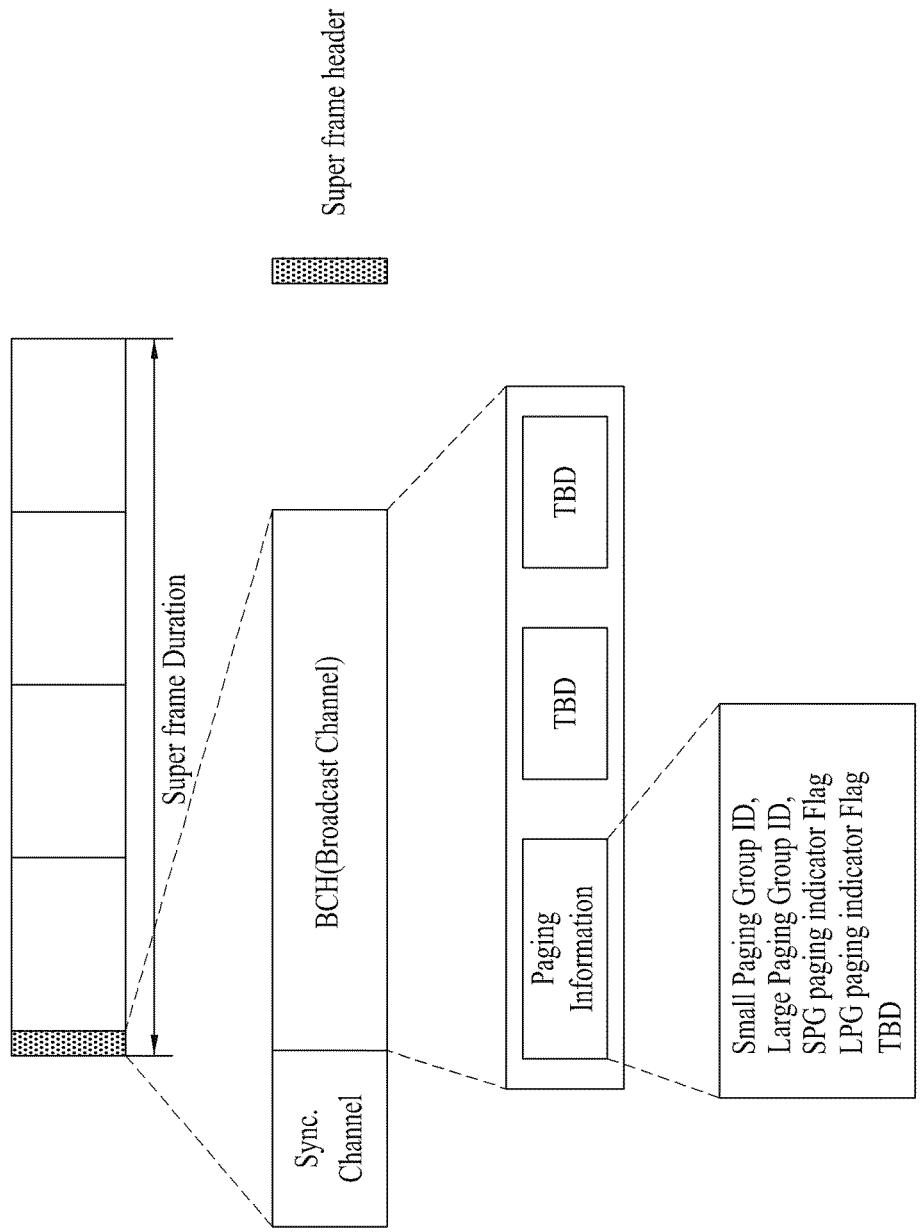
FIG. 3 is a diagram illustrating an example of a superframe header structure which includes paging information, in accordance with one embodiment of the present invention.

FIG. 3 is a diagram illustrating an example of a superframe header structure which includes paging information, in accordance with one embodiment of the present invention.

FIG. 3 illustrates a superframe header structure that can transfer paging information to a mobile station using one broadcast channel (BCH). Referring to FIG. 3, the superframe header can include a synchronization (Sync) channel field and a broadcast channel (BCH) field. Paging information can be included in the broadcast channel (BCH) field.

At this time, the paging information can include small paging group identifier (SPG ID), SPG offset, large paging group identifier (LPG ID), and LPG offset. LPG ID and SPG ID represent LPG and SPG to which the mobile station currently belongs to.

Also, in FIG. 3, the paging information can further include SPG paging indicator flag (SPGF) and LPG paging indicator flag (LPGF). The LPG paging indicator flag (LPGF) and the SPG paging indicator flag (SPGF) represent whether a paging message of a mobile station belonging to a specific LPG or a specific SPG exists. The SPG paging indicator flag (SPGF) and LPG paging indicator flag (LPGF) may be replaced with terms "SPG paging indicator usage flag" and "LPG paging indicator usage flag", respectively.

In other words, the mobile station can identify its SPG and/or LPG by checking SPG ID and/or LPG ID included in the paging information field of the superframe header. Also, the mobile station can identify whether there exists its paging message, through the SPGF and/or the LPGF. Moreover, the SPGF and the LPGF can be used with a paging indication bit which represents a frame through which the paging message is transmitted in a superframe. The paging indication bit may be included in the superframe header.

Figure 4:
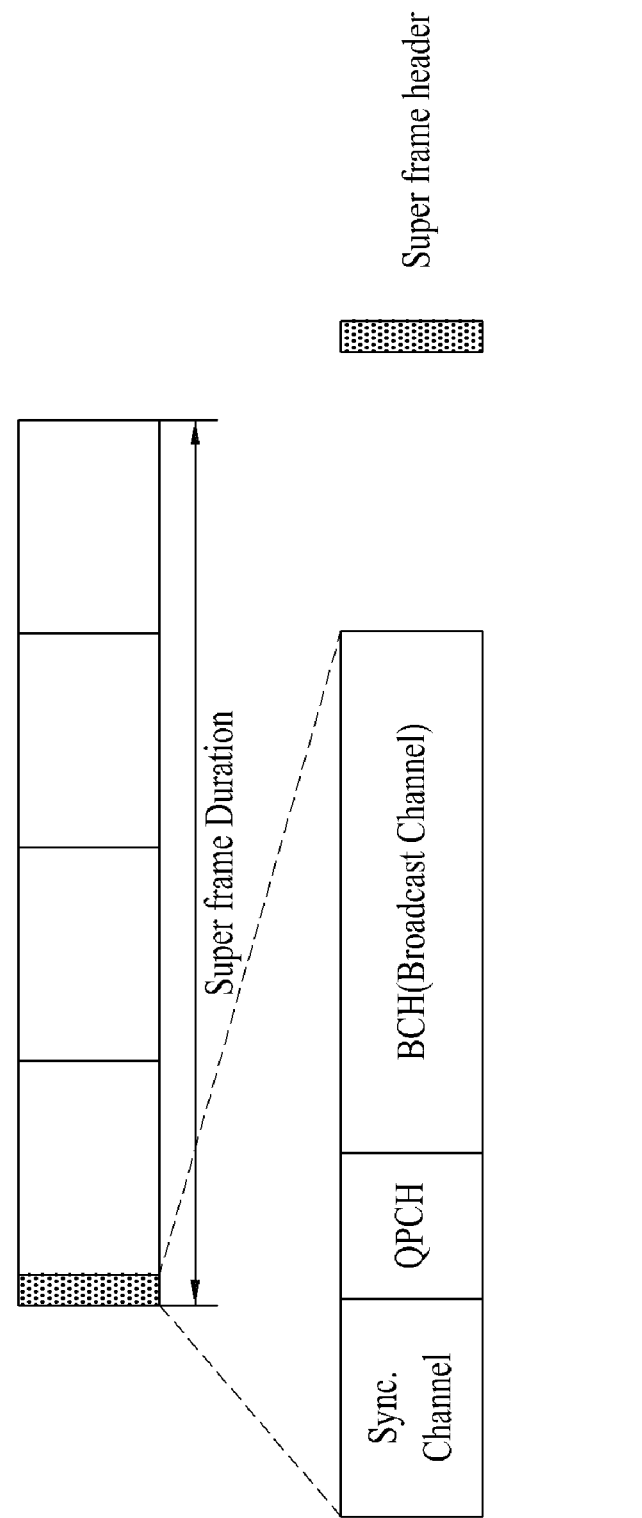
FIG. 4 is a diagram illustrating another example of a superframe header structure which includes paging information, in accordance with one embodiment of the present invention.

FIG. 4 is a diagram illustrating another example of a superframe header structure which includes paging information, in accordance with one embodiment of the present invention.

Referring to FIG. 4, the superframe header can include a synchronization (Sync) channel, a quick paging channel (QPCH), and a broadcast channel (BCH). At this time, the base station and/or the paging controller can transmit the QPCH to the mobile station, wherein the QPCH includes LPGF and/or SPGF. Also, the base station and/or the paging controller can transmit the BCH to the mobile station, wherein the BCH includes SPG ID and/or LPG ID.

In other words, the mobile station can previously identify whether there exists its paging message, through the QPCH. Accordingly, the mobile station can reduce its power consumption by remarkably reducing monitoring time of the paging message.

Figure 5:
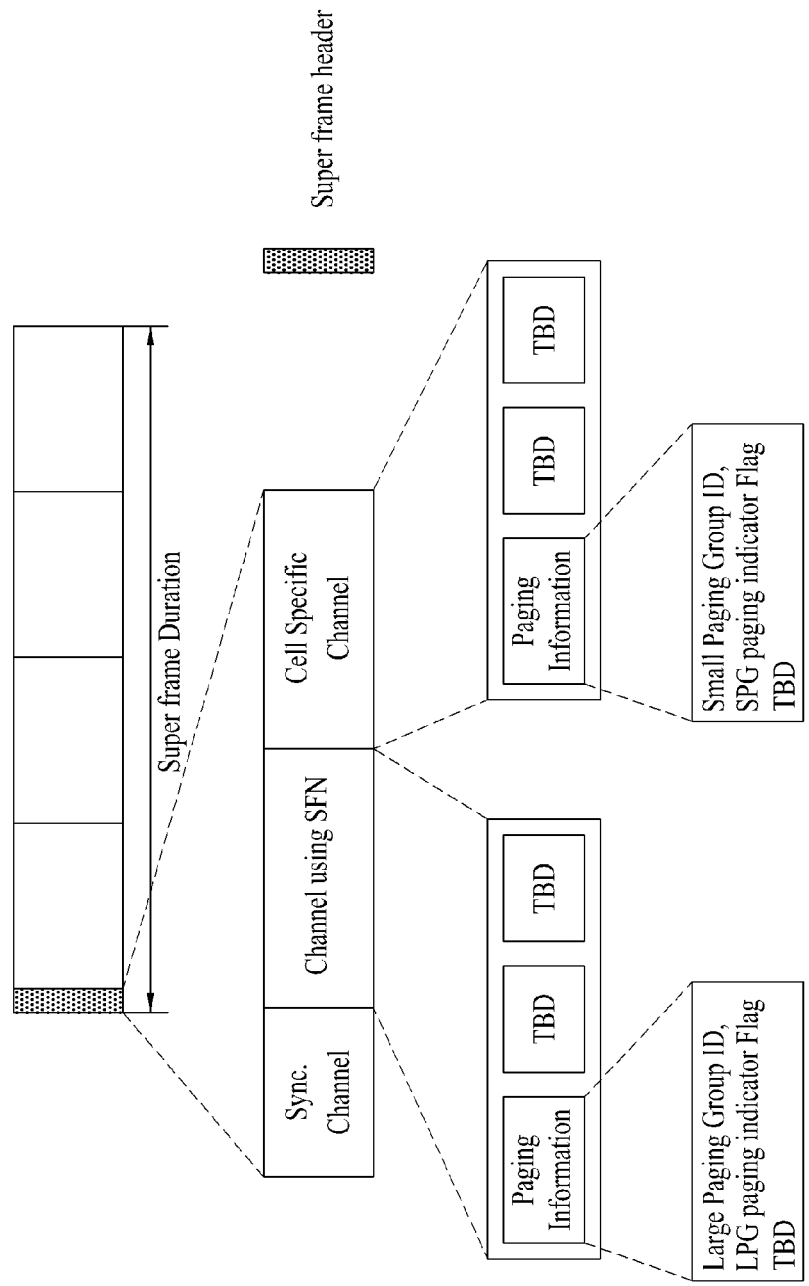
FIG. 5 is a diagram illustrating other example of a superframe header structure which includes paging information, in accordance with one embodiment of the present invention.

FIG. 5 is a diagram illustrating other example of a superframe header structure which includes paging information, in accordance with one embodiment of the present invention.

In FIG. 5, the serving base station can allocate large paging group identifier (LPG ID) and small paging group identifier (SPG ID) to the superframe header (SFH). Also, the serving base station can allocate LPG paging indicator flag (LPGF) and SPG paging indicator flag (SPGF) to the superframe header.

Referring to FIG. 5, the superframe header (SFH) can include a synchronization channel field and a broadcast channel field. At this time, the broadcast channel (BCH) field can be divided into one or more regions depending on functions. In one embodiment of the present invention, it is assumed that the BCH field is preferably divided into two regions. For example, the broadcast channel (BCH) field can include a single frequency network BCH (SFN BCH) and a cell specific BCH (CS BCH).

The SFN broadcast channel (SFN BCH) is a broadcast channel which uses a carrier network based on a single frequency, and the cell specific broadcast channel (CS BCH) is a broadcast channel which includes information effective for a specific cell only. The broadcast channels can be divided into three or more regions depending on user requirements or channel status.

Each of the SFN broadcast channel and the cell specific broadcast channel can include paging information. The paging information of the SFN broadcast channel can include LPG ID, LPG offset and LPGF, and the paging information of the cell specific broadcast channel can include SPG ID, SPG offset, and SPGF.

The reasons why LPG ID, LPG offset, and LPGF are included in the paging information field of the SFN BCH by the base station are as follows.

(1) According to the SFN mode, same data are transmitted with the same frequency within a broad range in accordance with the same modulation scheme. Accordingly, information included in a broadcast channel region which uses the SFN mode is preferably used in common by all mobile stations within the large paging group.

(2) As all base stations belonging to LPG broadcast information included in the SFN broadcast channel region using the SFN mode (for example, using same frequency), a bit error rate can be improved.

(3) If all base stations within LPG broadcast information of the SFN broadcast channel region using the same frequency in accordance with the SFN mode, LPG ID can be used as single frequency carrier network ID (SFN ID). Also, as the base station transmits LPGF through the SFN broadcast channel, mobile stations belonging to the LPG region can recognize that their paging message exists.

The reasons why the base station allocates SPG ID, SPG offset, and SPGF to the paging information field are as follows.

(1) Since information included in the cell specific BCH is effective for a specific cell only, it is preferable that the information can be used by mobile stations only included in the specific cell. The SPG can be defined by a small area that controls a small number of base stations. Accordingly, the mobile stations existing within the SPG are enough to receive specific information from the base stations only within the SPG not all base stations within the LPG.

(2) If the mobile stations move to different SPGs, specific SPG ID for a specific SPG is required to update location. Accordingly, management identifier of SPG unit is required. At this time, all base stations within the same SPG can have the same SPG ID.

(3) As SPGF is included in the cell specific BCH, the mobile station included in the predetermined SPG region can identify that its paging message exists. Accordingly, all the mobile stations included in all SPGs within the LPG do not need to monitor the paging message for the paging cycle. Namely, the mobile stations included in the specific SPG only have to monitor the paging message.

However, LPG ID, LPG offset, and LPGF can be included in the paging information field of the cell specific BCH in accordance with user requirements or channel status or other communication status. SPG ID, SPG offset, and SPGF can also be included in the paging information field of the SFN broadcast channel region.

2. Method for Optimizing Power Management of a Mobile Station Using Paging Offset According to another embodiment of the present invention, paging offset is newly defined. For example, In addition to the existing paging offset, LPG offset and SPG offset are defined in accordance with LPG and SPG.

Figure 6:
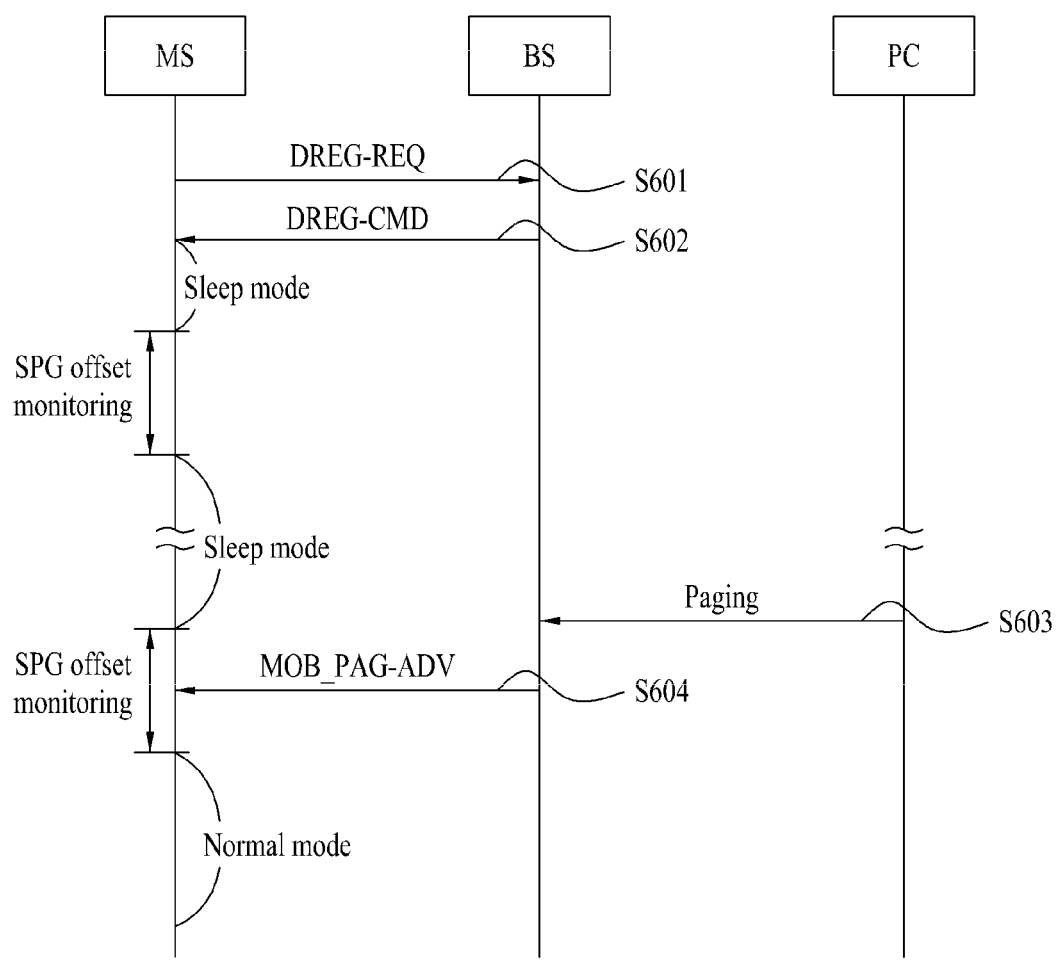
FIG. 6 is a diagram illustrating a method for optimizing power using paging offset in accordance with another embodiment of the present invention.

FIG. 6 is a diagram illustrating a method for optimizing power using paging offset in accordance with another embodiment of the present invention.

The mobile station transmits a deregistration request (DREG-REQ) message to a serving base station to enter an idle mode (S601).

The serving base station transmits a deregistration command (DREG-CMD) message to the mobile station to accept entrance of the mobile station to the idle mode (S602).

At this time, a paging information field can be included in the deregistration command (DREG-CMD) message. The paging information field includes information for receiving a paging message in the mobile station of an idle mode. The following Table 1 illustrates an example of a paging information field format that can be used in the embodiments of the present invention.

TABLE 1

| Parameter Name | Length | Value | Scope |
|---|---|---|---|
| Paging Information | | 1. PAGING_CYCLE - cycle in which the paging message is transmitted within the paging group.<br>2. PAGING_CYCLE_INDEX - determines the cycle in which the paging message is transmitted.<br>3. LARGE_PAGING_GROUP_OFFSET - determines the frame within the cycle in which the paging message is transmitted. Must be smaller than PAGING_CYCLE value.<br>4. SMALL_PAGING_GROUP_OFFSET - determines the frame within the cycle in which the paging message is transmitted. Must be smaller than PAGING_CYCLE value.<br>5. Large Paging-group-ID - ID of the Large paging group the MS is assigned to.<br>6. Small Paging-group-ID - ID of the Small paging group the MS is assigned to.<br>7. Small Paging Group Change Count - Count of the changing the Small Paging Group. | RNG-RSP DREG-CMD |

Referring to Table 1, the paging information field can include paging cycle, paging cycled index, large paging group offset, small paging group offset, LPG ID, and SPG ID. Also, the paging information field can further include SPG change count parameter in accordance with user requirements or channel status. The SPG change count will be described later.

In Table 1, the paging cycle represents a cycle that the paging message is transmitted within the paging group. The paging cycle index represents a cycle that the paging message is transmitted. The LPG offset represents a cycle that the paging message of the mobile station included in the LPG is transmitted within the paging cycle. The LPG offset is preferably smaller than the paging cycle. The LPG offset may also represent the number of a Paging frame that the paging message of the mobile station included in the LPG is transmitted within the paging cycle.

The SPG offset represents a cycle that the paging message of the mobile station included in the SPG is transmitted within the paging cycle. The SPG offset is also preferably smaller than the paging cycle. The LPG offset may also represent the number of a Paging frame that the paging message of the mobile station included in the LPG is transmitted within the paging cycle.

The SPG offset is preferably smaller than the LPG offset in view of characteristics of the LPG and the SPG.

Also, the DREG-CMD message can further include identifier information of the paging group at the time when the mobile station enters the idle mode. In Table 1, LPG ID and SPG ID represent LPG and SPG to which the mobile station belongs at the time when the mobile station enters the idle mode. In the embodiments of the present invention, the mobile station can be included in one or more multiple paging groups (for example, one or more LPGs and SPGs).

In Table 1, the SPG change count represents the number of SPG regions changed as the mobile station moves. Although the paging information of Table 1 is included in the DREG-CMD message, the paging information may be included in a ranging response (RNG-RSP) message transmitted from the mobile station to a target base station during location update.

Referring to FIG. 6 again, the mobile station receives paging information required to receive the paging message in the idle mode from the base station. Accordingly, the mobile station enters a sleep mode after receiving the DREG-CMD message, thereby minimizing power consumption.

Afterwards, the mobile station monitors a paging channel using SPG offset value of the small paging group to which the mobile station currently belongs, within the allocated paging cycle. At this time, the mobile station waits for receiving the paging message where the SPG offset value indicates. However, there is no paging message for the mobile station until now. Accordingly, the mobile station enters the sleep mode.

Afterwards, the mobile station again monitors the paging message from its SPG offset value. At this time, the paging controller transmits the paging message to the base station to which the mobile station belongs when call or external user data occurs in the paging controller (S603).

The base station transmits the paging message to the mobile station through the MOB_PAG-ADV message (S604).

The mobile station monitors the paging channel for a predetermined time in accordance with the SPG offset. At this time, the mobile station can perform data communication with the base station by returning to a normal mode as the mobile station has received the paging message.

In FIG. 6, the SPG offset is exemplarily used. However, the LPG offset may be used in accordance with user requirements or channel status. Of course, the SPG offset and the LPG offset may be used together. For example, if the mobile station strays from the SPG region, the mobile station can monitor the paging message using the LPG offset value.

For another example, in a state that the mobile station belongs to a specific SPG region, the mobile station may repeatedly move between the specific SPG region and another SPG region to change the paging group to the LPG region. In this case, the mobile station can receive the paging message using the LPG offset value without using the SPG offset value any longer.

Figure 7:
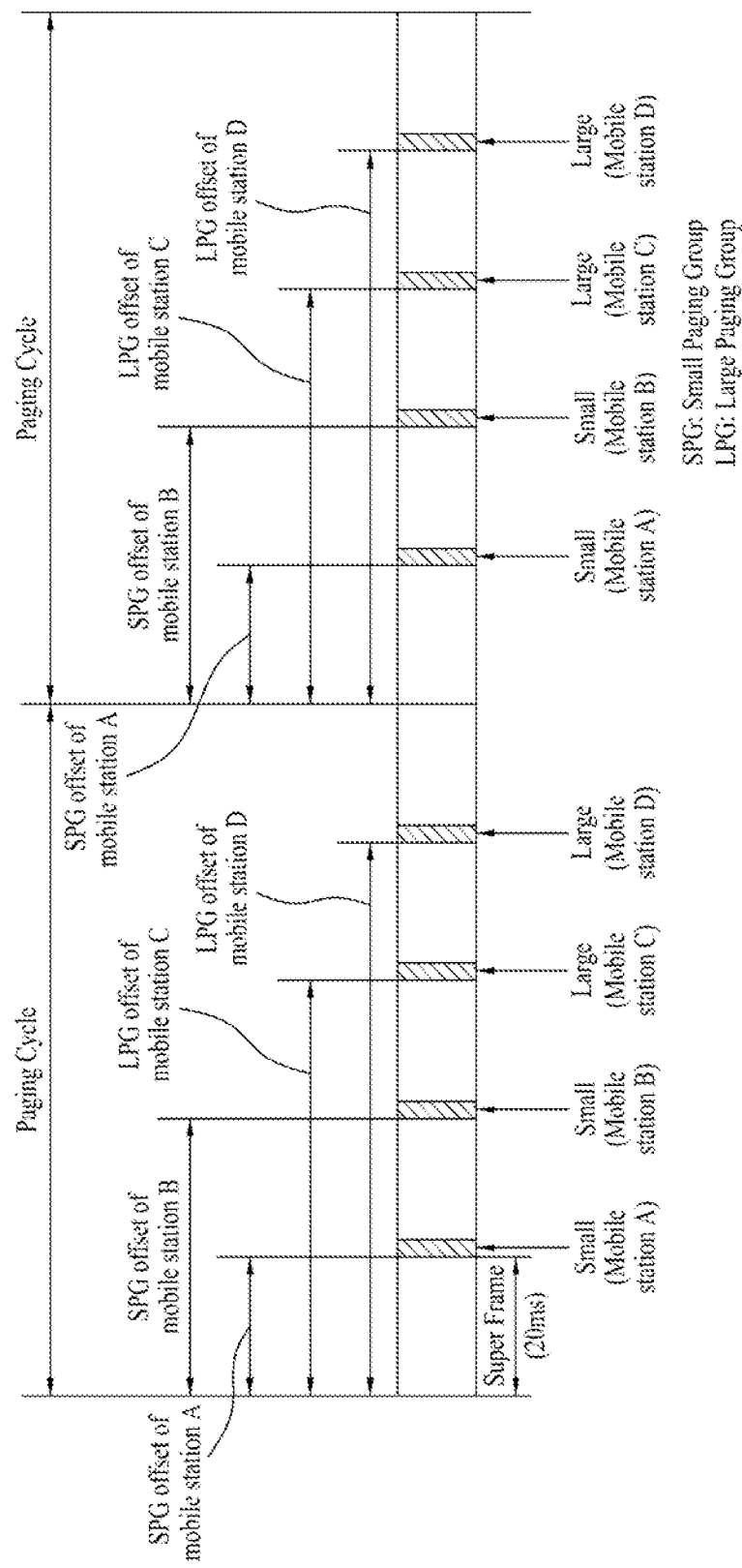
FIG. 7 is a diagram illustrating a method for using a paging cycle and paging offset in accordance with another embodiment of the present invention.

FIG. 7 is a diagram illustrating a method for using a paging cycle and paging offset in accordance with another embodiment of the present invention.

Referring to FIG. 7, one or more mobile stations can belong to the same paging group or different paging groups. For example, the mobile station A and the mobile station B may be included in different SPGs, and the mobile station C and the mobile station D may be included in different LPGs. Also, in FIG. 7, it is assumed that the SPG offset value and the LPG offset value are allocated differently. In FIG. 7, it is assumed that each of the mobile stations is currently in the idle mode and acquires paging information for receiving the paging message through the DREG-CMD message of FIG. 6.

Accordingly, each of the mobile stations can minimize power consumption by monitoring the paging message from the offset value allocated thereto. Namely, each of the mobile stations can minimize power consumption by reducing a decoding interval of a superframe header to identify the presence of the paging message.

In FIG. 7, each of the mobile stations decodes a superframe header only corresponding to its paging group. For example, the mobile station A can control the decoding cycle of the superframe header using the paging cycle and its SPG offset. Also, the mobile station C can control the decoding cycle of the superframe header using the paging cycle and its LPG offset. Of course, the mobile station B and the mobile station D may decode the superframe header from corresponding offset values using the SPG offset value or LPG offset value allocated thereto.

Also, in FIG. 7, each of the mobile stations can control a cycle of receiving the paging message in accordance with the paging cycle index included in the paging information.

For example, if the paging cycle index has a value of 0, the mobile station can respond to the paging message once for one paging cycle. If the paging cycle index has a value of 1, the mobile station can be set to respond to the paging message once for two paging cycles. Also, if the paging cycle index has a value of 2, the mobile station can be set to respond to the paging message once for three paging cycles.

Accordingly, although power consumption of the mobile station is reduced if the paging cycle index is great, the probability of successfully decoding the paging message is reduced as compared with that the paging cycle index is small.

In FIG. 7, the value of the paging cycle index can be set by various methods. For example, a fixed paging cycle can be allocated using a predetermined bit. Also, a frame or a subframe indicated by a specific offset can be represented by a bitmap value (for example, "0b0000000/000").

Moreover, a paging indication bit can be represented by a bitmap value such as "0b0001". Namely, if a bitmap using 4 bits is used as a paging paging indication bit, each bit of the bitmap may be associated with each frame of a superframe. Accordingly, the bitmap value "0b0001" may represent that a paging message is transmitted via the fourth frame of the superframe.

For example, in a case where a SPG paging indicator Flag is set to "1" during a paging listening interval, mobile stations included in the corresponding SPG can identify that there exists their paging message. Then, the mobile stations may monitor a paging indication bit in SFH. If the paging indication bit is set to "0b0001", the mobile station can decode the full paging message at the fourth frame of the superframe.

3. Paging Method Using SPG Change Counter

Figure 8:
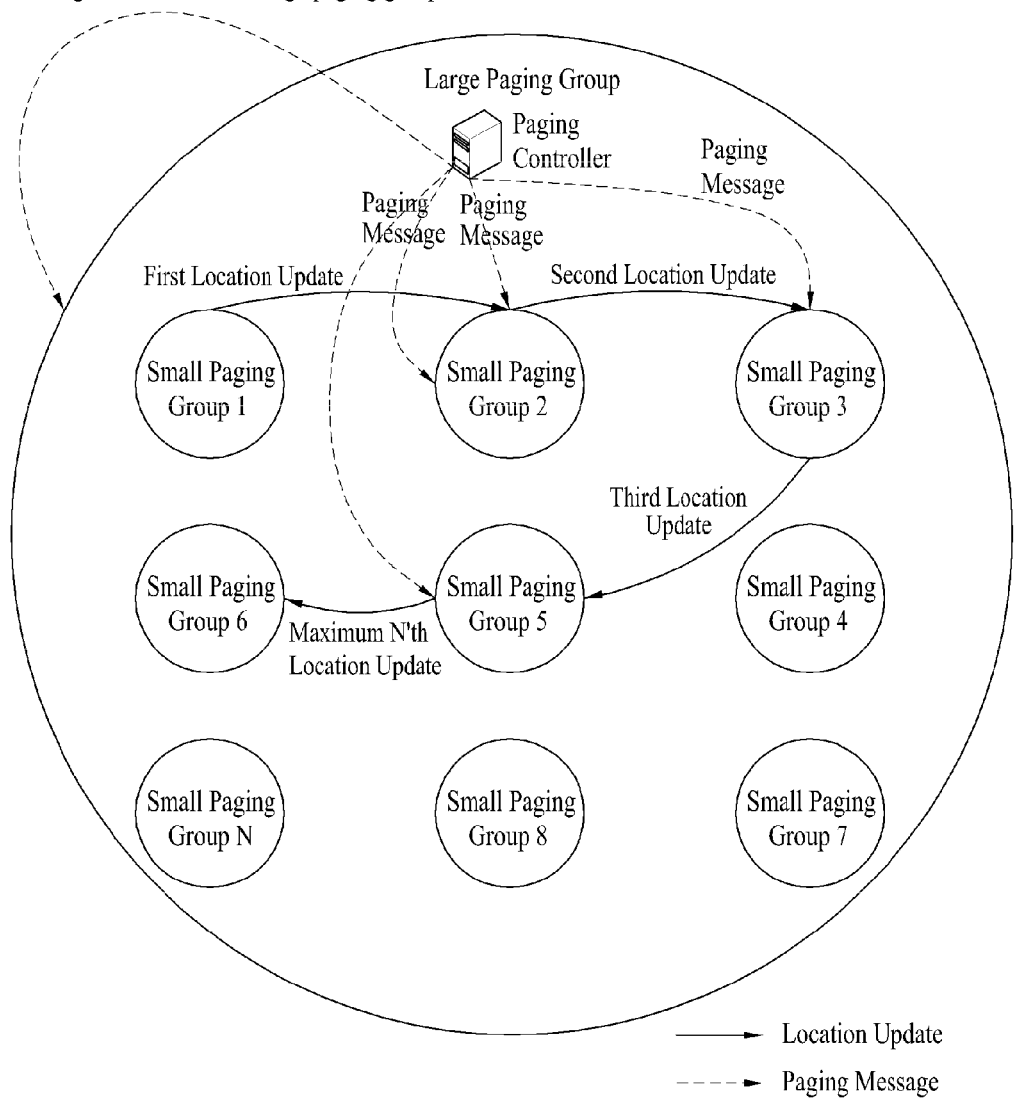
FIG. 8 is a diagram illustrating a paging method using a small paging group (SPG) change counter in accordance with still another embodiment of the present invention.

FIG. 8 is a diagram illustrating a paging method using a small paging group (SPG) change counter in accordance with still another embodiment of the present invention.

In FIG. 8, if the mobile station is located within a specific SPG, the paging controller transmits the paging message to the base station only within the specific SPG, whereby power consumption of the mobile stations within other SPGs can be reduced. Of course, if the mobile station is not located within a predetermined SPG, the paging controller can transmit the paging message to all base stations included in the large paging group (LPG).

Also, in FIG. 8, two paging group IDs(for example, LPG ID and SPG ID) are defined. Accordingly, all the mobile stations have specific SPG ID and LPG ID, and use them when the paging controller transmits the paging message. For example, the mobile station can receive the paging message using SPG ID and SPG offset value in a specific SPG region, and can receive the paging message using LPG ID and LPG offset value in the LPG region beyond the SPG region. In this case, the mobile station can selectively perform location update.

In FIG. 8, the mobile station performs location update if the SPG is changed. However, if the mobile station performs location update whenever the mobile station moves to another SPG, location update signaling overhead may occur.

Accordingly, according to still another embodiment of the present invention, the mobile station sets a predetermined small paging group change counter to perform location update as much as the maximum number of times N. Namely, if the mobile station moves to another SPG as much as the maximum number of times N, the paging controller can transmit the paging message to all base stations within the LPG not a specific SPG.

Referring to FIG. 8, the mobile station performs location update as much as the maximum number of times N when moving to SPG regions. Then, the mobile station can change its paging group to the LPG. This is because that signaling overhead may occur if the mobile station of high speed performs location update for every SPG change.

Accordingly, if the mobile station does not move the SPG as much as the maximum number of times N, the paging controller identifies SPG ID of the mobile station and transmits the paging message to the corresponding SPG. However, if the mobile station moves the SPG as much as the maximum number of times N, the paging controller can transmit the paging message to the LPG not a specific SPG.

In the embodiments of the present invention, the mobile station, the base station and/or the paging controller can include the SPG change counter. Accordingly, the mobile station, the base station and/or the paging controller can try to change the paging group if the SPG change counter value fulfils the change condition of paging group (change of the maximum number of times N).

In FIG. 8, when the mobile station changes the SPG as much as the maximum number of times N, the mobile station changes its paging group from a specific SPG to LPG. Then, the mobile station can decode the superframe header using LPG offset not SPG offset (see FIG. 6 or FIG. 7).

For reference, the paging controller can identify whether the SPG region of the mobile station has been changed, by identifying the SPG change count included in the message received from the base station during location update. Also, the mobile station can identify whether the SPG region of the mobile station has been changed, through the SPG change count value within the paging information field of the RNG-RSP message received from the base station during location update.

As still further embodiment of the present invention, the mobile station and the base station performed in accordance with the aforementioned embodiments of the present invention will be described.

The mobile station can be operated as a transmitter in the uplink, and can be operated as a receiver in the downlink. Also, the base station can be operated as a receiver in the uplink, and can be operated as a transmitter in the downlink. Namely, the mobile station and the base station can include a transmitter and a receiver to transmit information or data.

The transmitter and the receiver can include processor, module, part, and/or means for performing the embodiments of the present invention. Particularly, the transmitter and the receiver can include a module (means) for encoding a message, a module for decoding the encoded message, and an antenna for transmitting and receiving the message.

The mobile station used in the embodiments of the present invention can include a low power radio frequency (RF)/intermediate frequency (IF) module. Also, the mobile station can include a means, module or part for performing controller function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

The base station can transmit data received from an upper layer to the mobile station by wireless or wire. The base station can include a low power RF/IF module. Also, the base station can include a means, module or part for performing controller function, orthogonal frequency division multiple access (OFDMA) packet scheduling, time division duplex (TDD) packet scheduling and channel multiplexing function, medium access control (MAC) frame variable control function according to service characteristics and radio wave condition, handover function, authentication and encryption function, packet modulation and demodulation function for data transmission, quick packet channel coding function, and real-time modem control function, thereby performing the aforementioned embodiments of the present invention.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for paging a terminal in a wireless access system, the method performed by the terminal and comprising:
   receiving a deregistration command message from a first base station, the deregistration command message comprising one or more paging offsets for the terminal and one or more paging group identifiers for identifying one or more paging groups assigned to the terminal;
   entering an idle mode;
   receiving paging information from a second base station at a first subframe of a first frame of a superframe during a paging listening interval, the paging information comprising one or more paging group identifiers for identifying one or more paging groups to which the second base station belongs; and
   determining whether at least one of the one or more paging groups to which the second base station belongs is the same as the one or more paging groups assigned to the terminal by using the paging information; and
   receiving a paging message during the paging listening interval if it is determined that at least one of the one or more paging groups to which the second base station belongs is the same as the one or more paging groups assigned to the terminal.

2. The method according to claim 1, wherein paging group identifiers and paging offsets corresponding to two or more paging groups are assigned to the terminal if the terminal is assigned the two or more paging groups.

3. The method according to claim 1, further comprising not receiving the paging message during the paging listening interval if it is determined that none of the one or more paging groups to which the second base station belongs are the same as the one or more paging groups assigned to the terminal.

4. The method according to claim 1, wherein a smallest paging group of the one or more paging groups assigned to the terminal is a primary paging group and the other of the one or more paging groups assigned to the terminal are secondary paging groups.

5. The method according to claim 1, further comprising deriving each start point of the paging listening interval using the one or more paging offsets corresponding to the one or more paging groups assigned to the terminal.

6. The method according to claim 1, wherein the first base station and the second base station are the same base station.

7. A terminal for performing paging in wireless access system, the terminal comprising:
a receiving unit configured for:
receiving a deregistration command message from a first base station, the deregistration command message comprising one or more paging offsets for the terminal and one or more paging group identifiers for identifying one or more paging groups assigned to the terminal; and
receiving paging information from a second base station at a first subframe of a first frame of a superframe during a paging listening interval, the paging information received after entering an idle mode and comprising one or more paging group identifiers for identifying one or more paging groups to which the second base station belongs; and
a determining unit for determining whether at least one of the one or more paging groups to which the second base station belongs is the same as the one or more paging groups assigned to the terminal by using the paging information,
wherein the receiving unit is further configured for receiving a paging message during the paging listening interval if it is determined that at least one of the one or more paging groups to which the second base station belongs is the same as the one or more paging groups assigned to the terminal.

8. The terminal according to claim 7, wherein paging group identifiers and paging offsets corresponding to two or more paging groups are assigned to the terminal if the terminal is assigned the two or more paging groups.

9. The terminal according to claim 7, wherein the receiving unit is further configured for not receiving the paging message during the paging listening interval if it is determined that none of the one or more paging groups to which the second base station belongs are the same as the one or more paging groups assigned to the terminal.

10. The terminal according to claim 7, wherein a smallest paging group of the one or more paging groups assigned to the terminal is a primary paging group and the other of the one or more paging groups assigned to the terminal are secondary paging groups.

11. The terminal according to claim 7, further comprising a deriving unit configured for deriving each start point of the paging listening interval using the one or more paging offsets corresponding to the one or more paging groups assigned to the terminal.

12. The terminal according to claim 7, wherein the first base station and the second base station are the same base station.

* * * * *